(12) United States Patent
Baumann et al.

(10) Patent No.: US 7,073,636 B2
(45) Date of Patent: Jul. 11, 2006

(54) DISK BRAKE WITH MECHANICAL SELF-BOOSTING

(75) Inventors: Dietmar Baumann, Hemmingen (DE);
Dirk Hofmann, Ludwigsburg (DE);
Herbert Vollert, Vaihingen/Enz (DE);
Willi Nagel, Remseck/Hochdorf (DE);
Andreas Henke, Diemelstadt (DE);
Bertram Foitzik, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/754,562

(22) Filed: Jan. 12, 2004

(65) Prior Publication Data

US 2004/0154881 A1  Aug. 12, 2004

(30) Foreign Application Priority Data

Jan. 23, 2003 (DE) .................. 103 02 516

(51) Int. Cl.
*F16D 55/46* (2006.01)

(52) U.S. Cl. .................................... 188/72.2

(58) Field of Classification Search .............. 188/70 B, 188/72.2, 72.7
See application file for complete search history.

(56) References Cited

U.S. PATENT DOCUMENTS

| 2,655,228 | A | * | 10/1953 | Eksergian | .................. | 188/72.2 |
| 3,664,468 | A | * | 5/1972 | Oka | .......................... | 188/72.2 |
| 4,375,250 | A | * | 3/1983 | Burgdorf | .................. | 188/72.2 |
| 2004/0108175 | A1 | * | 6/2004 | Schautt | ..................... | 188/72.7 |
| 2005/0126864 | A1 | * | 6/2005 | Boisseau | ................... | 188/72.2 |

FOREIGN PATENT DOCUMENTS

WO      WO 02/10609 A1 *  2/2002

* cited by examiner

*Primary Examiner*—Thomas J. Williams
(74) *Attorney, Agent, or Firm*—Ronald E. Greigg

(57) ABSTRACT

An electromechanical disk brake with mechanical self-boosting for instance by a ramp mechanism, which is intended for use in motor vehicles in which the ramp mechanism is braced in a circumferential direction relative to a brake disk on a brake bracket, in order thereby to keep a caliper guide of a floating caliper free of frictional and braking forces of the disk brake.

5 Claims, 2 Drawing Sheets

DISK BRAKE WITH MECHANICAL SELF-BOOSTING

BACKGROUND OF THE INVENTION

1. Field of the Invention

The invention relates to a disk brake with mechanical self-boosting which is intended in particular for motor vehicles.

2. Description of the Prior Art

Hydraulically actuated disk brakes without self-boosting, which are currently conventional, have a brake bracket and a caliper. The brake bracket and the caliper are parts resting one inside the other; the brake bracket is mounted fixedly on one steering knuckle or the like of a vehicle and retains the caliper transversely displaceable to a brake disk by means of a caliper guide. As their actuating unit, hydraulic disk brakes have a piston-cylinder unit, in which the cylinder is usually part of the caliper. With the piston, a friction brake lining can be pressed against one side of the brake disk. A reaction force displaces the caliper transversely to the brake disk, and as a result the caliper presses a second friction brake lining against the other side of the brake disk and brakes it. Because of the transverse displaceability, the caliper of such disk brakes is known as a floating caliper. In the circumferential direction, or more precisely parallel to a circumferential direction of the brake disk, the friction brake linings are braced on the brake bracket; as a result, a frictional or braking force exerted upon braking by the rotating brake disk on the friction brake linings pressed against the brake disk is transmitted directly to the brake bracket and not to the brake bracket via the caliper and the caliper guide. Because of this construction, the caliper guide is largely free of forces; the braking and frictional forces are transmitted from the friction brake linings to the brake bracket, and the actuating and contact-pressure force of the friction brake linings against the brake disk are internal forces of the caliper.

The situation is different in disk brakes with mechanical self-boosting. They have a self-boosting mechanism, for instance with a ramp mechanism or wedge mechanism. In other words, a friction brake lining is displaceable in the circumferential direction of the brake disk and is braced on a ramp or the like mounted in the caliper. The ramp is a support face extending obliquely at an angle to the brake disk and it need not necessarily be flat and instead can also have a curved course. If for actuation of the disk brake the friction brake lining is pressed against the brake disk, the rotating brake disk, because of the friction existing between it and the friction brake lining, presses the friction brake lining in the circumferential direction. As a result of the bracing of the friction brake lining on the ramp extending obliquely to the brake disk, a wedge effect is obtained, which exerts an additional contact-pressure force of the friction brake lining against the brake disk. The aforementioned contact-pressure force of the friction brake lining against the brake disk is greater than an actuating force that the actuating unit exerts on the friction brake lining. Examples of such disk brakes with mechanical self-boosting by means of a ramp mechanism are found in German Patent Disclosure DE-OS 20 52 496, German Patent DE 198 19 564 C2, and German Patent Disclosure DE 100 37 055 A1; the last two of these references disclose disk brakes that are actuated electromechanically, and the first of these references discloses a disk brake actuated via cables and levers.

A frictional force exerted, when the disk brake is actuated, in the circumferential direction on the friction brake lining by the rotating brake disk is introduced into the caliper via the ramp, and it must be transmitted from the caliper guide to the brake bracket or some other fixed component. This force acts transversely to the caliper guide. The caliper guide must be dimensioned so as to be adequately stable for transmitting the frictional force exerted by the rotating brake disk on the friction brake lining. At the same time, the force to be transmitted from the caliper guide upon braking impairs smooth running of the caliper guide.

The above remarks apply accordingly for other self-boosting mechanisms, such as a lever mechanism, in which a lever that is oblique to the brake disk braces the friction brake lining that is pressed against the brake disk. The lever mechanism can in theory be considered as analogous to the ramp mechanism.

OBJECT AND SUMMARY OF THE INVENTION

In the disk brake of the invention, the self-boosting mechanism is braced in a circumferential direction to the brake disk on the brake bracket and not on the caliper. As a result, a frictional or braking force exerted, when the disk brake is actuated, in the circumferential direction on the friction brake lining by the rotating brake disk is transmitted to the brake bracket and does not put a load on the caliper guide which guides the caliper displaceably on the brake bracket transversely to the brake disk. As a result, the caliper guide is substantially free of force; in particular, it need not transmit the high braking forces that occur during braking. As a result, the caliper guide can be comparatively small, and its smooth running is unimpaired by forces exerted on it. Another advantage is easier restoration of the caliper after a brake actuation, and in particular easier adjustment of the air clearance, which is due to the smooth running of the caliper guide. In addition, reduced brake lining wear when the disk brake is unactuated can be expected.

In the disk brake of the invention, the bracing of the self-boosting mechanism transversely to the brake disk on the caliper is done in the same way as in the prior art, so that a contact-pressure force of one friction brake lining against the brake disk is transmitted as an internal force from the caliper to the other friction brake lining.

BRIEF DESCRIPTION OF THE DRAWINGS

The invention will be better understood and further objects and advantages thereof will become more apparent from the ensuing detailed description of preferred embodiments, taken in conjunction with the drawings, in which.

DESCRIPTION OF THE PREFERRED EMBODIMENTS

Figure 1:
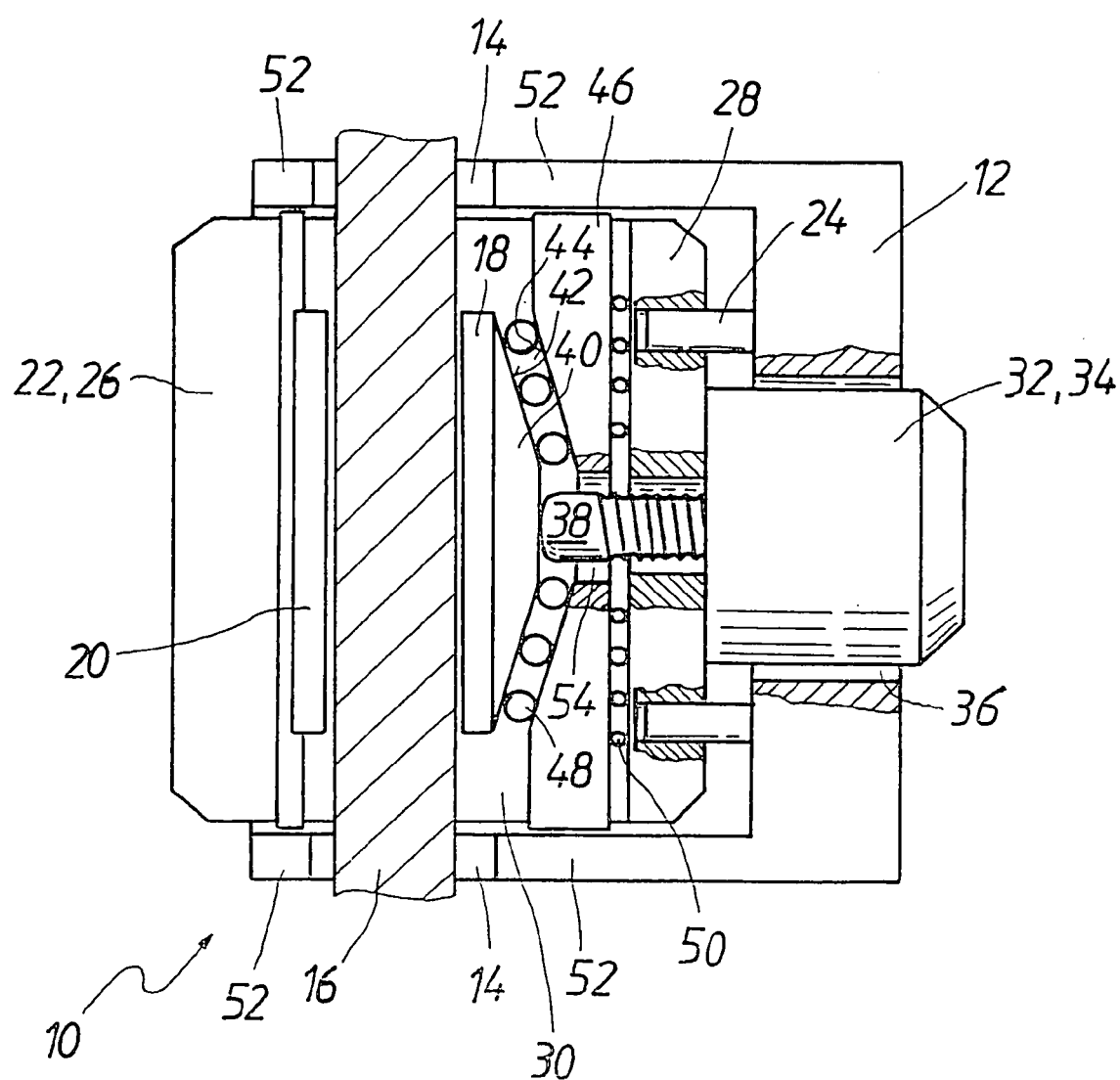
FIG. 1 shows a disk brake of the invention radially from the inside, that is, from the direction of a pivot axis of one brake disk.

The disk brake 10 of the invention, shown in the drawing, has mechanical self-boosting and is actuated electromechanically. It is intended for use in a motor vehicle, not shown. The disk brake 10 has a brake bracket 12, which is firmly bolted or screwed for instance to one steering knuckle (not shown) of a motor vehicle. The brake bracket 12 has a recess 14 on both sides, and with them it fits over a brake disk 16 on the circumference. On both sides of the brake disk 16, the brake bracket 12 protrudes radially approximately as far inward as friction brake linings 18, 20 of the disk brake 10, which are disposed one on each side of the brake disk 16.

A caliper 22 rests in the brake bracket 12 and is guided displaceably with a caliper guide 24 transversely to the brake disk 16 in the brake bracket 12. The caliper guide 24, in the exemplary embodiment of the invention shown and described, is embodied as a rod guide. Because of its transverse displaceability, the caliper 22 can also be called a floating caliper.

In cross section, the caliper has the shape of a U, with two legs 26, 28 and a crosspiece 30. The crosspiece 30 is located outside a circumference of the brake disk 16; the legs 26, 28 are located one on each side of the brake disk 16 and protrude radially to the brake disk 16 approximately as far inward as the friction brake linings 18, 20.

The two friction brake linings 18, 20 are located in the caliper 22, one on each side of the brake disk 16. For actuation of the disk brake 10, the friction brake lining 18, shown on the right in the drawing, can be pressed against the brake disk 16 by means of an actuating unit 32 to be described hereinafter. As a result of this pressure against the one friction brake lining 18, the caliper 22 is displaced in a manner known per se transversely to the brake disk 16 and presses the other friction brake lining 20 against the other side of the brake disk 16, so that the brake disk 16 is braked by both friction brake linings 18, 20.

The actuating unit 32 functions electromechanically. Of the actuating unit 32, what can be seen from outside in the drawing is a housing 34, in which the parts of the actuating unit 32 are accommodated. The actuating unit 32 has an electric motor, preferably a step-down gear, and a spindle drive or other rotation/translation conversion gear. For the sake of space-saving, compact embodiment of the actuating unit 32, the electric motor can be embodied as a hollow-shaft motor, and the spindle drive can be disposed inside the hollow shaft of the electric motor. The step-down gear is preferably a planetary gear, which can likewise be accommodated at least partly inside the hollow shaft of the electric motor. Such actuating units 32 are known per se to one skilled in the art; in this respect, International Patent Disclosure WO 96/03301 can be cited as an example and is hereby incorporated by reference with regard to one possible embodiment of the actuating unit 32.

The actuating unit 32 is mounted fixedly (rigidly) on the caliper 22. The housing 34 of the actuating unit 32 extends through a bore 36 in the brake bracket 12 without contacting the bore, so that the actuating unit 32 is displaceable together with the caliper 22 transversely to the brake disk 16 in the brake bracket 12.

Still other actuating units are also possible; for instance, the disk brake 10 can also be actuated hydraulically. This will be discussed herein below in conjunction with FIG. 2.

A spindle 38 of the spindle drive of the actuating unit 32 acts upon the friction brake lining 18 and presses it against the brake disk 16 in order to actuate the disk brake 10. The friction brake lining 18 has a double ramp 40, with two ramp faces 42, on its side remote from the brake disk 16. The two ramp faces 42 extend obliquely at an acute angle to the brake disk 16, and the inclines of the ramp faces 42 are counter to one another. With its ramp faces 42, the double ramp 40 is braced on abutment faces 44 of an abutment 46. The abutment 46 is a platelike element with a V-shaped countersunk feature, which forms the two abutment faces 44. The abutment faces 44 are at a large obtuse angle to one another and extend parallel to the ramp faces 42. For reducing friction, roller bodies (rollers 48) can be disposed between the ramp faces 42 and the abutment faces 44.

The abutment 46 is received parallel to the brake disk 16 in the caliper 22, or in other words displaceable in the circumferential direction of the brake disk. The abutment 46 is braced, transversely to the brake disk 16, on one leg 28 of the caliper 22; for reducing friction, roller bodies (needles 50) can be disposed between the abutment 46 and the leg 28. The leg 28 forms a brace for the abutment 46 transversely to the brake disk 16. Parallel to the brake disk 16, or in other words in its circumferential direction, a displacement travel of the abutment 46 is limited by side walls 52 of the brake bracket 12. The side walls 52 form braces for the abutment 46 in a circumferential direction to the brake disk 16. A play between the side walls 52 and the abutment 46 and thus a displacement travel of the abutment 46 in the circumferential direction to the brake disk 16 is slight; in principle, there need be no play here. To reduce friction, roller bodies (not shown) can also be disposed between the abutment 46 and the side walls 52, bracing the abutment, of the brake bracket 12.

The abutment 46 has a through hole 54 in its middle, which surrounds the spindle 38 with play, so that the abutment 46 does not contact or exert any forces on the spindle 38.

The other friction brake lining 20 is supported in the circumferential direction to the brake disk 16, once again on the side walls 52 of the brake bracket 12, and rests in the transverse direction to the brake disk 16 on the leg 26 of the caliper 22. Once again, to reduce friction, roller bodies (not shown) can be disposed between the friction brake lining 20 and the side walls 52 of the brake bracket 12.

If for actuation of the disk brake 10 the friction brake lining 18 is pressed by the actuating unit 32 against the rotating brake disk 16, the brake disk 16 exerts a frictional force on the friction brake lining 18 in the circumferential direction of the brake disk 16, or in other words parallel to the brake disk 16. As a result, the friction brake lining 18 is displaced parallel to the brake disk, that is, upward or downward in terms of the drawing, as a function of the direction of rotation of the brake disk 16. In the process, the friction brake lining 18 is braced, via one of its two ramp faces 42, on the associated abutment face 44. Because of the oblique course of the ramp face 42 and the abutment face 44, a wedge effect is obtained, which brings about a contact-pressure force of the friction brake lining 18 against the brake disk 16. This contact-pressure force is added to the actuation force with which the actuating unit 32 presses the friction brake lining 18 against the brake disk 16. The force with which the friction brake lining 18 is pressed against the brake disk 16 is as a result greater than the actuation force exerted by the actuating unit 32 on the friction brake lining 18. The disk brake 10 thus has self-boosting. The double ramp 40 and the abutment 46 form a ramp mechanism, which brings about the self-boosting of the disk brake 10. Because of the use of the double ramp 40, the self-boosting exists in both directions of rotation of the brake disk 16. If self-boosting for one direction of rotation of the brake disk 16 suffices, then a single ramp (not shown) is sufficient, instead of the double ramp 40. By employing different ramp angles of the double ramp 40 in the two directions of rotation, self-boosting actions of different magnitude can be attained for the two directions of rotation of the brake disk 16, for instance for driving forward and in reverse. The double ramp 40 and the abutment 46 form a self-boosting mechanism of the disk brake 10.

Since the abutment 46 is displaceable parallel to the brake disk 16 in the caliper 22 and is braced, parallel to the brake disk 16 or in other words in its circumferential direction, on the side walls 52 of the brake bracket 12 that form the braces, the frictional or braking force exerted upon braking by the brake disk 16 on the friction brake lining 18 is transmitted to the side walls 52 of the brake bracket 12 via the abutment 46. The caliper 22 is not acted upon by the frictional or braking force in the circumferential direction of the brake disk 16; as a result, the caliper guide 24 of the caliper 22 in the brake bracket 12 is free of such forces.

The other friction brake lining 20 is likewise braced in the circumferential direction to the brake disk 16 on the side walls 52 of the brake bracket 12, so that once again, the frictional or braking force is transmitted directly to the brake bracket 12 and is not introduced into the caliper guide 24.

Figure 2:
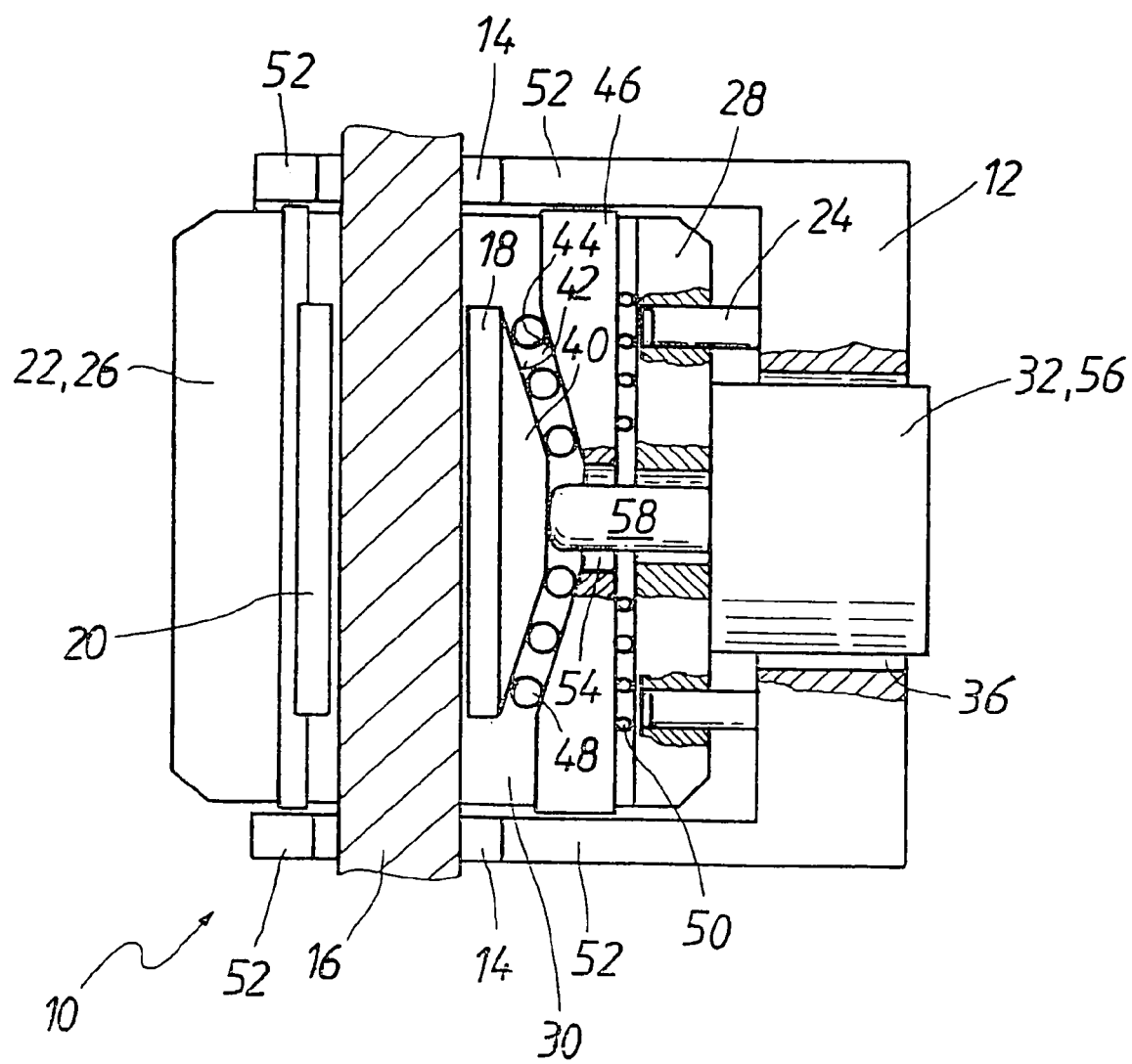
FIG. 2 shows a modified embodiment of the disk brake of FIG. 1 according to the invention.

In FIG. 2, an electromechanical actuating unit 32 is replaced with a hydraulic actuating unit, also identified by reference numeral 32. The hydraulic actuating unit 32 has a cylinder 56, which is mounted fixedly on the caliper 22. A piston, not visible, resting in the cylinder 56 acts upon the friction brake lining 18 via a piston rod 58, so that the friction brake lining 18 can be pressed hydraulically, instead of electromechanically, against the brake disk 16. Otherwise, the two disk brakes 10 shown in FIGS. 1 and 2 match one another and function in the same way. To avoid repetition, for FIG. 2 reference is made to the discussion of FIG. 1. For identical components, the same reference numerals are used in both drawings.

The foregoing relates to preferred exemplary embodiments of the invention, it being understood that other variants and embodiments thereof are possible within the spirit and scope of the invention, the latter being defined by the appended claims.

We claim:

1. A disk brake with mechanical self-boosting for use in motor vehicles, comprising a brake bracket, a floating caliper, a caliper guide which guides the caliper transversely displaceably on the brake bracket, an actuating unit with which a friction brake lining can be pressed against a brake disk, and having a self-boosting mechanism which increases a contact-pressure force of the friction brake lining against the brake disk, the self-boosting mechanism (40,46) comprises a ramp mechanism having one brace (52) in a circumferential direction to the brake disk (16) on the brake bracket (12) and another brace (28) transversely to the brake disk (16) on the caliper (22), whereby, when the disk brake is actuated, a frictional or braking force exerted in the circumferential direction to the brake disc on the friction brake lining by the rotating brake disk is transmitted to the brake bracket and is not transmitted to the caliper guide.

2. The disk brake in accordance with claim 1, wherein the self-boosting mechanism (40,46) is received displaceably in the caliper (22) in a circumferential direction to the brake disk (16).

3. The disk brake in accordance with claim 1, wherein the disk brake (10) comprises an electromechanical actuating unit (32).

4. The disk brake in accordance with claim 1, wherein the disk brake (10) comprises a hydraulic actuating unit (32).

5. The disk brake in accordance with claim 1, wherein the actuating unit (32) is mounted on the caliper (22).

* * * * *